(12) United States Patent
Race

(10) Patent No.: US 9,643,543 B1
(45) Date of Patent: May 9, 2017

(54) HINGE FOR TOOL BOXES AND THE LIKE AND PARTICULARLY VEHICLE-MOUNTED TOOL BOXES

(71) Applicant: Randall Craig Race, Lilburn, GA (US)

(72) Inventor: Randall Craig Race, Lilburn, GA (US)

( * ) Notice: Subject to any disclaimer, the term of this patent is extended or adjusted under 35 U.S.C. 154(b) by 169 days.

(21) Appl. No.: 14/544,880

(22) Filed: Mar. 2, 2015

(51) Int. Cl.
*B60R 13/01* (2006.01)
*B60R 9/06* (2006.01)
*B60R 11/06* (2006.01)
*B21D 53/40* (2006.01)

(52) U.S. Cl.
CPC .............. *B60R 9/065* (2013.01); *B21D 53/40* (2013.01); *B60R 11/06* (2013.01)

(58) Field of Classification Search
CPC ....... B21D 53/40; B50R 13/01; B50R 13/013; B50R 9/055
USPC ......................................... 224/404, 403, 402
See application file for complete search history.

(56) References Cited

U.S. PATENT DOCUMENTS

| | | | | |
|---|---|---|---|---|
| 1,740,866 A * | 12/1929 | McBarron | ............... | E05D 11/10 16/293 |
| 2,043,551 A * | 6/1936 | Nekola | ..................... | B23P 6/00 16/DIG. 42 |
| 3,165,225 A * | 1/1965 | Reitzel | .................. | E05C 19/006 206/259 |
| 3,656,727 A * | 4/1972 | Greenlee | ............... | A47F 5/0025 206/806 |
| 4,283,083 A * | 8/1981 | Johnson | ................... | B60R 11/06 220/529 |
| 5,186,510 A * | 2/1993 | Stapp | ....................... | B60R 11/06 190/107 |
| 5,299,722 A * | 4/1994 | Cheney | ..................... | B60R 7/14 206/317 |
| 5,419,476 A * | 5/1995 | White | ....................... | B60R 9/00 224/315 |
| 5,484,092 A * | 1/1996 | Cheney | ..................... | B60R 7/14 206/317 |
| 5,601,206 A * | 2/1997 | Haas | ........................ | B60R 9/00 16/254 |
| 5,730,344 A * | 3/1998 | Mauch | ..................... | B60R 9/00 224/402 |
| 6,217,103 B1 * | 4/2001 | Schultz | .................. | B60J 7/1621 224/404 |
| 6,899,372 B1 * | 5/2005 | Keller | ...................... | B60J 7/141 296/100.06 |
| 7,052,066 B2 * | 5/2006 | Emery | ..................... | B60R 11/06 296/37.1 |
| 7,555,816 B2 * | 7/2009 | Walker | ..................... | B60P 3/14 16/269 |

(Continued)

*Primary Examiner* — Brian D Nash
(74) *Attorney, Agent, or Firm* — Kenneth E. Darnell

(57) ABSTRACT

An improved hinge particularly suitable for improving a truck tool box such as is conventionally mountable into a bed of a pick-up truck or the like, the hinge of the invention being decorative, less subject to tampering, capable of increased strength as a hinge per se relative to existing structures utilized in the manufacture of truck tool boxes as well as imparting increased strength to such tool boxes in total, and permitting more automated manufacture of such tool boxes, the hinge of the invention being integrally formed with a portion of the tool box lid and with an adjacent portion of the box to connect said lid and box yet allow ease of rotation therebetween to open and close said box.

25 Claims, 7 Drawing Sheets

(56) References Cited

U.S. PATENT DOCUMENTS

| | | | | |
|---|---|---|---|---|
| 8,262,159 B2* | 9/2012 | Daniels, Jr. | ............... | B60N 2/24 |
| | | | | 224/404 |
| 8,869,576 B2* | 10/2014 | O'Leary | ............... | E05B 47/023 |
| | | | | 70/257 |
| 8,931,819 B2* | 1/2015 | Daniel | ................... | B60J 7/1621 |
| | | | | 29/428 |
| 9,073,495 B2* | 7/2015 | Toutant | ................... | B60R 13/01 |
| 2005/0029275 A1* | 2/2005 | Baughman | ........... | B65D 43/168 |
| | | | | 220/845 |
| 2006/0102669 A1* | 5/2006 | Fouts | ........................ | B60R 9/00 |
| | | | | 224/404 |
| 2006/0266778 A1* | 11/2006 | Allotey | ................... | B60R 11/06 |
| | | | | 224/403 |
| 2008/0061198 A1* | 3/2008 | Noyes | ..................... | B60R 9/048 |
| | | | | 248/205.1 |
| 2011/0132947 A1* | 6/2011 | Spencer | .................. | B60R 11/06 |
| | | | | 224/404 |
| 2016/0193800 A1* | 7/2016 | Skinner | ................ | B31D 1/0043 |
| | | | | 493/340 |

* cited by examiner

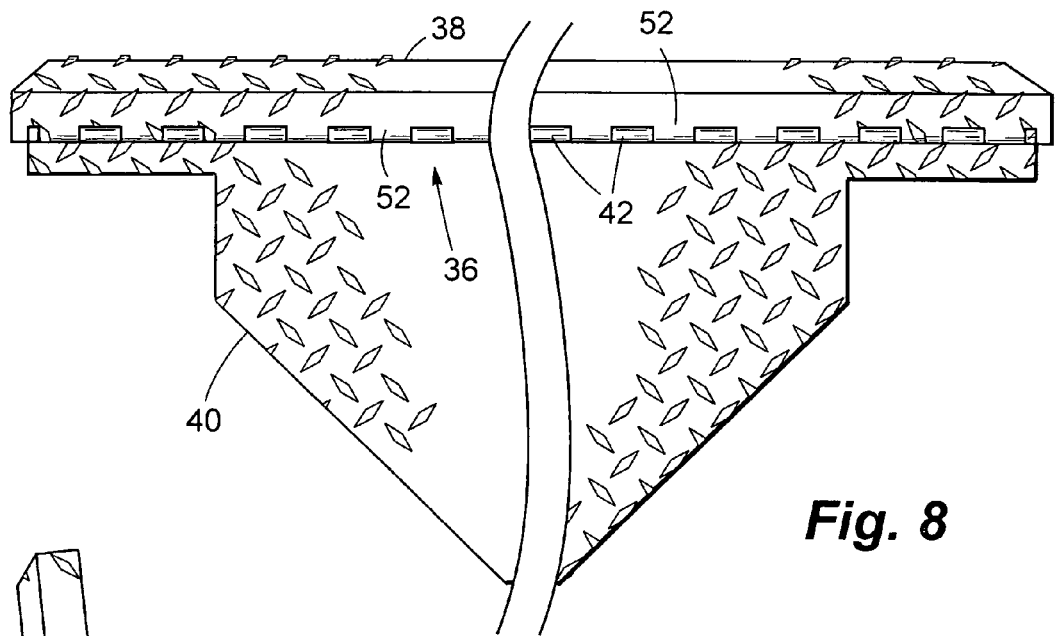
*Fig. 8*
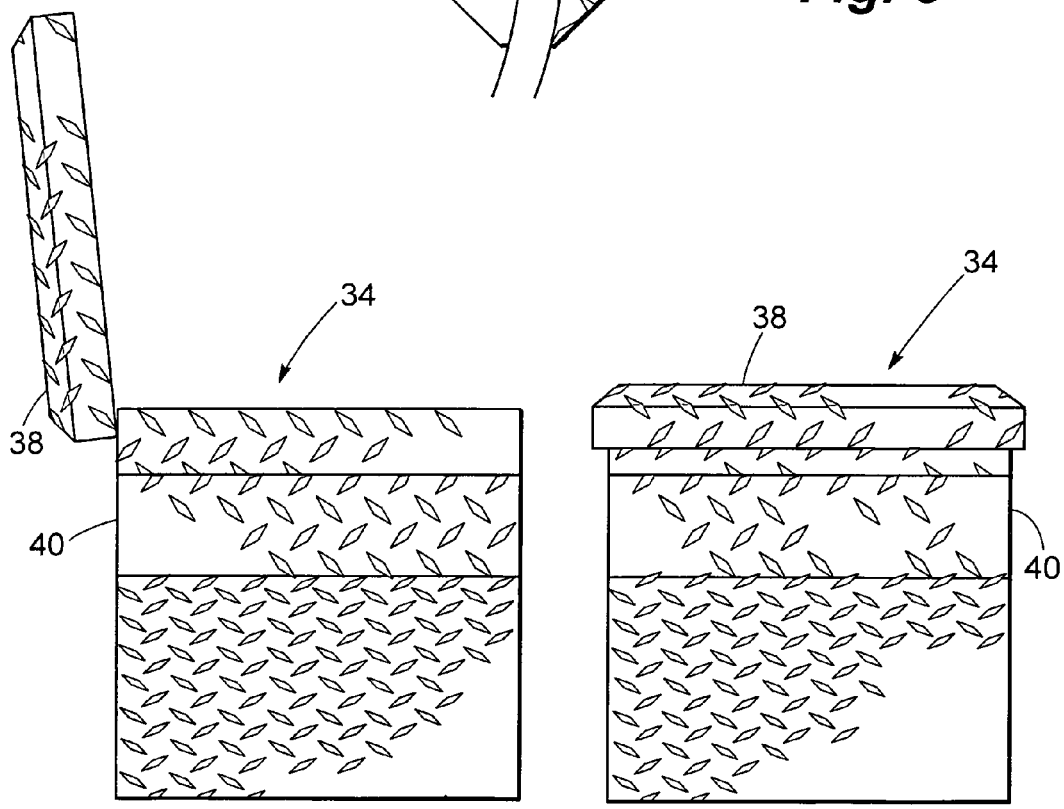
*Fig. 10*     *Fig. 9*

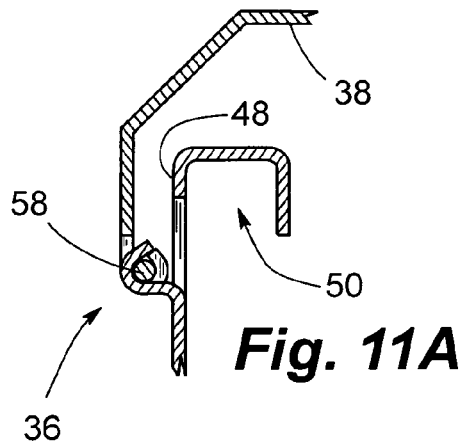
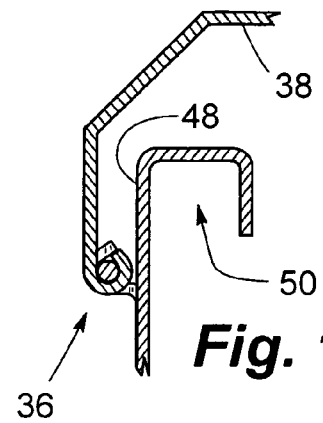
*Fig. 11A*  *Fig. 11B*
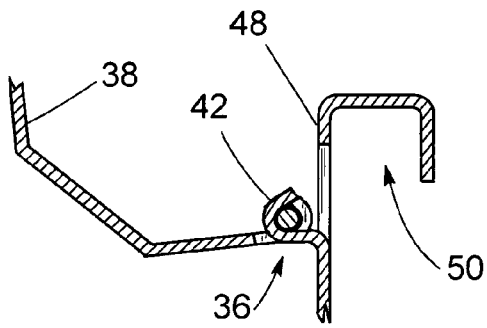
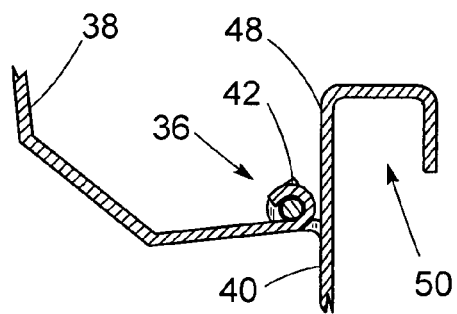
*Fig. 11C*  *Fig. 11D*
*Fig. 12A*
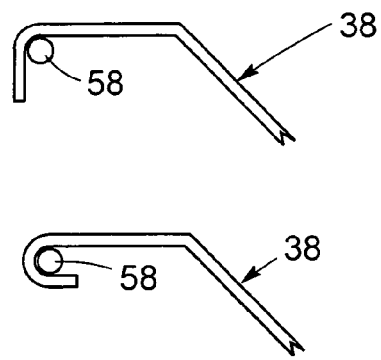
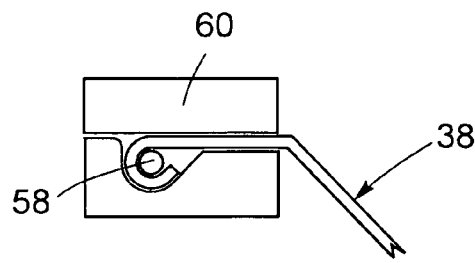
*Fig. 12B*  *Fig. 12C*

HINGE FOR TOOL BOXES AND THE LIKE AND PARTICULARLY VEHICLE-MOUNTED TOOL BOXES

BACKGROUND OF THE INVENTION

1. Field of the Invention

The invention relates generally to hinge structure and particularly to a hinge conveniently formable in adjacent portions of a tool box lid and box portion to facilitate automated manufacture of the tool box and the hinge.

2. Description of the Prior Art

Tool boxes intended for mounting within the bed of a vehicle such as a pick-up truck conventionally are fixedly yet removably mounted within such a truck bed, most often to the rear of the vehicle passenger compartment. Such tool boxes usually comprise the general shape of a rectangular solid open centrally for receiving tools and the like within a "box" portion that is covered by a lid pivotally attached thereto by means of a hinging structure typically taking the form of a "piano hinge" purchased by a tool box manufacturer and affixed to the box portion and to the lid by means of pop rivets and by spot welds respectively. Manufacture of such tool boxes is thus time-consuming and costly due to purchase of a hinge essentially intended for other uses and adaptable for use only with difficulty in the production of the tool box. Substantial time is required to position the piano hinge respectively on the lid and box portion for riveting and welding, the typical tool box requiring drilling of a number of holes in one longitudinally extending portion of the piano hinge formed typically of aluminum for subsequent placement of pop rivets and the formation of a number of spot welds in another longitudinally extending portion of the piano hinge, these operations typically being manually accomplished and thus being subject to inconsistent and unsightly results which cause such tool boxes to exhibit a less than satisfactory appearance especially in a retail show room where most such tool boxes are viewed by prospective buyers.

Compounding the thus stated disadvantages of the use of piano hinges as the essential hinge element of such tool boxes, such as cost of the piano hinge and the cost of attaching an obviously add-on element to the tool box with potential workmanship deficiencies, is the lack of strength inherent in the piano hinge itself and the lack of strength imparted to the tool box per se by the piano hinge. Further, the use of piano hinges in the manufacture of such tool boxes and the like renders difficult the automated manufacture and associated consistency of manufacture characteristic of such automated manufacture and particularly such manufacture as can be accomplished quickly and efficiently with the use of tool and die technology which results in precise and consistent formation of a hinge formed integrally with the lid and box portion of a tool box, such as a conventional truck tool box according to the teachings of the present invention.

It can therefore be appreciated that a need exists for an improved truck tool box hinge also useful in other similar environments, wherein the hinge and the tool box itself exhibits improved decorative value and improved strength of the hinge itself and the overall tool box per se and which can be more easily and less expensively manufactured.

SUMMARY OF THE INVENTION

The invention provides a truck bed tool box improved by a hinge formed integrally with the tool box with one portion of the hinge being formed in a flange-like skirt portion of a lid of the tool box and a complementary portion of the hinge being formed in an upper edge of the box portion of the tool box adjacent to the lower edge of a downwardly depending skirt portion of the lid, the hinge acting to allow relative movement between the lid and box portion of the tool box to open and close the tool box, automated manufacturing methodology also being disclosed herein for manufacture of the hinge so as to produce a precise hinge with an attractive appearance bespeaking of a finished product rather than of an add-on quality indicative of an unfinished appearance. The hinge of the invention also provides additional strength to the hinge function itself and also to the relatively light weight and inherently unstable nature of such a tool box occasioned by conventional manufacture of such tool boxes from extremely low gauge aluminum metal or other metals such as rolled steel. The tool box is thus capable of withstanding forces not accommodated by tool boxes of conventional manufacture and design such as those tool boxes wherein a piano hinge is mounted often with inconsistent placement between a lid and box portion of such tool boxes by means of pop rivets and spot welds thereby rendering an expensively produced tool box having relatively low strength coupled with a quality of manufacture of a low degree.

The inventive hinge of the invention is also capable of use with tool boxes such as those formed of painted steel including such commercially available products as those known by the trade names of "JOB BOX" and "JOBOX" and which can be carried in the bed of a truck and readily removed therefrom or which can be placed at a work site on at least a semi-permanent basis once delivered thereto, typically in the bed of a truck or the like. Such tool boxes are also typically fabricated with simple, relatively low strength piano hinges as the only structure present on the tool box allowing normal closure function. Piano hinges so used suffer from all of the inadequacies inherent to such use with truck tool box structure fitted with piano hinges even though typically formed of higher gauge aluminum or such metals (except for a stainless steel hinge pin) including cost and difficulty of manufacture of an attractive and easily produced product.

Accordingly, it is a primary object of the invention to provide a hinge for a tool box such as a truck bed tool box manufactured with low gauge metal and which hinge increases the finished appearance of such tool boxes relative to conventionally manufactured tool boxes.

It is another object of the invention to provide a hinge for a tool box such as a truck bed tool box manufactured with low gauge metal and which hinge increases the strength of the hinging element used in manufacture of the tool box and also of the tool box itself relative to conventionally manufactured tool boxes.

It is still a further object of the invention to provide a hinge for a tool box such as a truck bed tool box and which is amenable to manufacture with automated manufacturing procedures capable of precise fabrication of such tool boxes, thereby decreasing manufacturing costs while improving the quality of the manufactured product.

It is yet another object of the invention to provide a hinge formed in and disposed between the lid and the box portion of a tool box on which the lid closes and opens the box portion and wherein the hinge replaces a piano hinge as conventionally used therefor and which requires no additional material other than a stainless steel hinge pin beyond that typically required for manufacture of the lid and the box portion and no separate acquisition of a hinge element and no difficult attachment of such acquired hinge element to a lid and box portion of said tool box.

Further objects and advantages of the invention will become more readily apparent in light of the following detailed description of the preferred embodiments.

BRIEF DESCRIPTION OF THE DRAWINGS

FIG. 8 is a rear elevational view of the invention formed with a truck tool box and with central portions thereof cut away for ease of illustration;

FIG. 9 is a side view of the tool box of FIGS. 4-8;

FIG. 10 is a side view of the open tool box of FIG. 7;

FIGS. 11 A through D are detail sectional views taken through lines 11A-11A and 11B-11B of FIG. 6 and lines 11C-11C and 11D-11D of FIG. 7;

FIGS. 12 A through C are detail views illustrating the forming of a portion of the hinge of the invention on the lid of a truck tool box;

DESCRIPTION OF THE PREFERRED EMBODIMENTS

Figure 1:
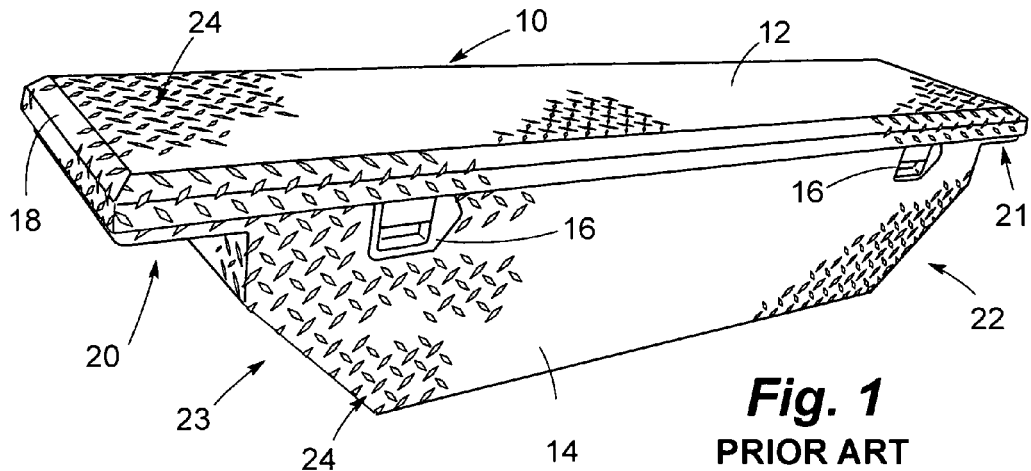
FIG. 1 is a perspective view of a prior art truck tool box mountable particularly within the bed of a truck such as a pick-up truck.

Referring now to the drawings and particularly to FIG. 1, a conventional truck bed tool box is seen at 10 to be fitted with a lid 12 mounted by means of a conventional hinge (not shown) to a box portion 14 and to the lid 12, the tool box 10 being conventionally outfitted with latches 16 inter alia that may be lockable to preclude unauthorized access to the interior of the tool box 10. The tool box 10 as shown in FIG. 1 can be fitted with more than one lid as is also conventional in the art or with the hinging function being otherwise located on the tool box 10 or similar tool box. A tool box such as shown at 10 is typically mounted in the open bed of a vehicle such as a pick-up truck (not shown) immediately to the rear of the passenger compartment and/or may be mounted along sides of said bed or otherwise. The tool box 10 may be outfitted with lift cylinders, detent elements, spacing elements and mounting structure (not shown), these elements facilitating use of the tool box 10 such as for accommodating relatively large and heavy metallic tools and the like useful for effecting various job operations.

The tool box 10 is typically fabricated of relatively rigid metal and particularly aluminum sheet metal of requisite strength and corrosion resistance. Aluminum best used for fabrication of such tool boxes typically is formed of conventional thicknesses within a thickness range of from 0.08 to 0.063 mil being useful, the sheets being formed using conventional techniques and then welded or mechanically fastened to produce the lid 12 and the box portion 14 inter alia. Due to the need for such tool boxes to span the width of a truck bed or some similar dimension, such tool boxes are relatively large dimensionally ranging from 50 to 85 inches or nominally so in length, from 18 to 28 inches in depth and from 13 to 15 inches in height. The lid 12 of a conventional tool box 10 is typically formed of a single flat sheet of aluminum or other metal such as steel and can be formed with a bevel at 18 to impart a more pleasing appearance than would a lid 12 formed with the outward appearance of a rectangular solid. Additionally, the lid is formed with downwardly depending skirts on all four sides of the lid. The box portion 14 is often formed as shown in FIG. 1 with depending end portions 20 and with corners slanted as at 22 on each lower end portion of the box portion 14 to facilitate mounting between wheel hubs (not shown) of a truck or similar vehicle. The lid 12 and box portion 14 may also be provided as is conventional with a diamond tread plate pattern seen generally at 24 and which can extend over the full outer surfaces of the tool box 10 to provide an aesthetic appeal.

Due to destabilizing forces incident to use of such tool boxes and caused by general operation of a vehicle to which such tool boxes are mounted as well as the need to open, close and otherwise use tool boxes in an intended manner, it is critical that these tool boxes exhibit strength requirements not typically provided by the sheet material from which the tool boxes are typically formed. Lid structures, for example, have been reinforced in the art by addition of stabilizing foams to enhance strength and rigidity of an otherwise conventional lid. Welds between sheet metal portions of box portions such as the box portion 14 must also be carefully produced for imparting strength and rigidity as well as for reasons of appearance.

Figure 2:
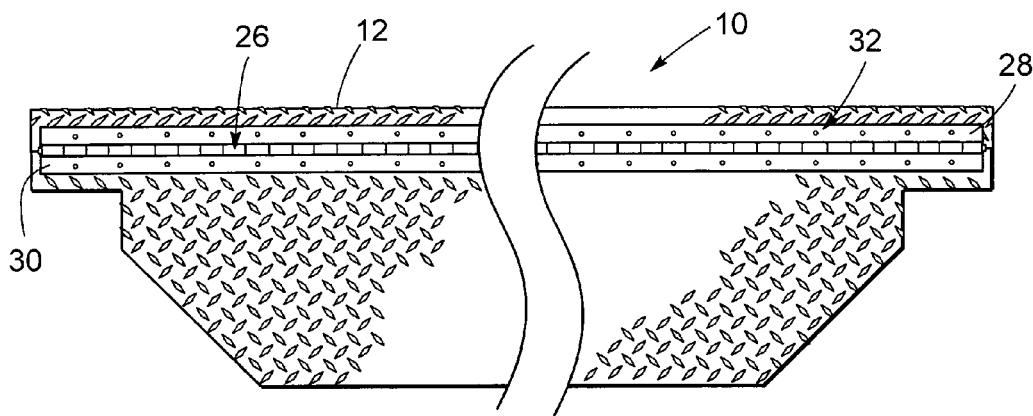
FIG. 2 is a rear elevational view of a conventional truck tool box with central portions cut away for ease of illustration and showing a prior art piano hinge mounted in a flattened configuration to a rear portion of a lid and a rear portion of the box.

As can be appreciated with reference to FIG. 2, tool box 10 is also provided with a conventional (portions of the hinge 26 typically being formed of aluminum except for a central stainless steel hinge pin as will be described hereinafter) piano hinge 26 joined to the lid 12 and the box portion 14 to permit egress into the tool box 10 as well as closing of the tool box. As seen in FIG. 2, fastening wings 28 and 30 of the piano hinge 26 are typically seen to comprise flat, elongated and planar aluminum elements extending lengthwise of the piano hinge 26, the wing 28 being affixed to a rearmost, downwardly depending, elongated skirt portion of the lid 12 while the wing 30 is also affixed along an upper portion of the box 14 adjacent to the lid 12, thereby conveniently and conventionally allowing the tool box 10 to be opened and closed. The piano hinge 26 constitutes an add-on mechanism intended for use in other arts and thus imparts an unfinished ad-hoc appearance to the tool box 10 yet the industry has relied on use of piano hinges essentially since its inception even though a piano hinge must be painstakingly placed between a lid structure and a box structure for mounting therebetween by use of either riveting and/or welding operations capable of causing misalignment of the relative portions of the tool box and hinge. The tool box 10 of FIG. 2, due to often having the diamond or similar pattern 24 formed thereon forces use of pop rivets 32 for joining the piano hinge 26 to both the lid 12 and the box portion 14, an operation typically requiring drilling of numerous aligned apertures (not shown) in the wings 28 and 30 for receipt of said pop rivets 32. Pop rivets are preferred in the piano hinge 26 mounting of the piano hinge 26 to both the lid 12 and the box portion 14 due to the fact that the "diamonds" of the pattern 24 extend above the plane of the metal sheets forming the lid 12 and box portion 14 respectively thus causing the use of spot welds to be less effective in securing the wings 28, 30 respectively to the lid 12 and the box portion 14.

The strength of the tool box 10 is not appreciably enhanced through use of a piano hinge 26 as shown in FIG. 2 in addition to a failure of the piano hinge 26 to enhance the appearance of the tool box 10. Further, the use of a separately manufactured and costly add-on as is a piano hinge 26 as well as the difficulties and costs associated with attaching the piano hinge 26 to the tool box 10 and further requiring manual efforts to attach the piano hinge 26 to the lid 12 and box portion 14 lead to higher costs due to sourcing of the piano hinges and due to manufacturing processes that are inherently inconsistent resulting in undesirable appearance as well as low strength of the tool box 10 per se as well as at the points of attachment between the lid 12 and the box portion 14 and also leading to increased costs.

Figure 3:
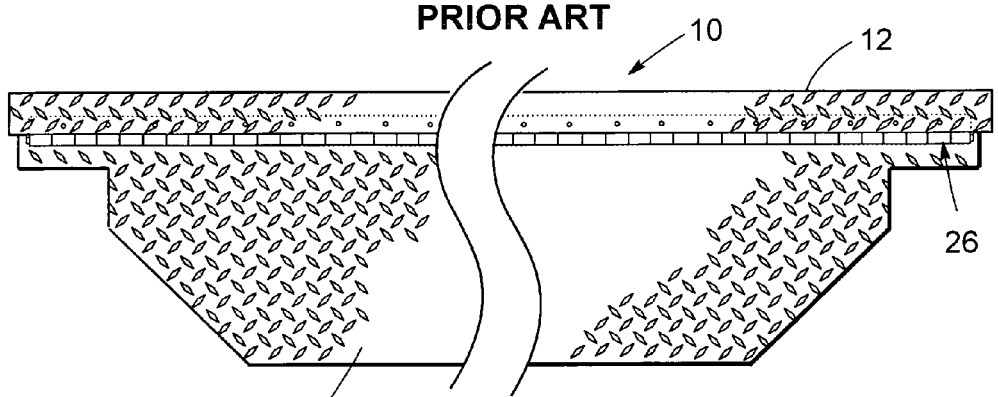
FIG. 3 is a rear elevational view of another conventional truck tool box with central portions cut away for ease of illustration and showing a prior art piano hinge mounted in another configuration to adjacent portions of a tool box lid and box.

FIG. 3 illustrates a tool box essentially identical to the tool box 10 of FIGS. 1 and 2 and which is provided with a piano hinge 26 essentially identical to the piano hinge of FIG. 2 although mounted differently to the lid 12 and to the box portion 14. In the mounting arrangement of the piano hinge 26 to the tool box 10 as seen in FIG. 3, one wing 28 of the hinge 26 is mounted by pop rivets to an upper edge of the box portion 14 since the surface of said box portion 14 is typically covered by a pattern such as the diamond pattern 24, thereby rendering weldable contact difficult. The other wing 30 of the piano hinge 26 contacts a flat, unpatterned undersurface of a depending skirt of the lid 12 thereby allowing the use of spot welds (not shown) to attach the piano hinge 26 to the lid 12, spot welds typically being manually effected and thus being time-consuming to produce as well as subject to errors in effectuation. Further, spot welding is subject to "burn thru" to the outside visible surface. The cost of mounting the piano hinge 26 to the tool box 10 as conventionally seen in FIG. 3 inter alia is therefore costly, does not contribute to a pleasing appearance and is not adaptable to automation with attendantly resulting efficiencies, hinge and tool box strength and consistent and enhanced appearance.

As can be appreciated from the foregoing discussion of the prior art, it can be generally stated that conventional manufacture of these tool boxes such as the tool box 10 now produced by virtually every manufacturer of same worldwide can be seen to involve cutting of a flat sheet of metal, typically aluminum sheet, using a conventional laser, turret punch or die to form a blank from which sheet various amounts of metal have been removed to allow bending and folding operations to be accomplished to result in a tool box of a particularly intended conformation.

Typically, an hydraulic press brake of conventional design is used to bend each straight side of the blank at a time. In doing so, the blank is rotated after a first operation and successively bent to shape the blank in a desirable manner. In such a process, various bends can be of different lengths and a different bending tool must be mounted into the press brake or the blank taken to a second and/or then third or more press brakes. On completion of all of the required bends, the variously shaped blanks are mounted in a conventional clamping device or welding jig for welding of all corners and locations where the several edges closely oppose each other. Hardware, such as latches, gas shocks, etc., and including a piano hinge 26, is then attached to the skeleton of the tool box. With particular reference to the piano hinge 26, the piano hinge 26 is clamped to the box portion 14 of the tool box 10 and aligned therewith and manually drilled and pop riveted one hole at a time in a number of places, typically 12 to 15 places. As noted herein, portions of the piano hinge 26 having flat, elongated surfaces which must be mounted to a bumpy diamond surface of the tool box when diamond tread plate pattern is used requires tedious manufacture. Manufacture of a tool box or the like utilizing the present hinge obviates this tedious manufacture. Welding is utilized conventionally in the form of numerous spot welds where flat portions of the piano hinge 26 contact and abut flat, unpatterned surfaces of the tool box.

Figure 4:
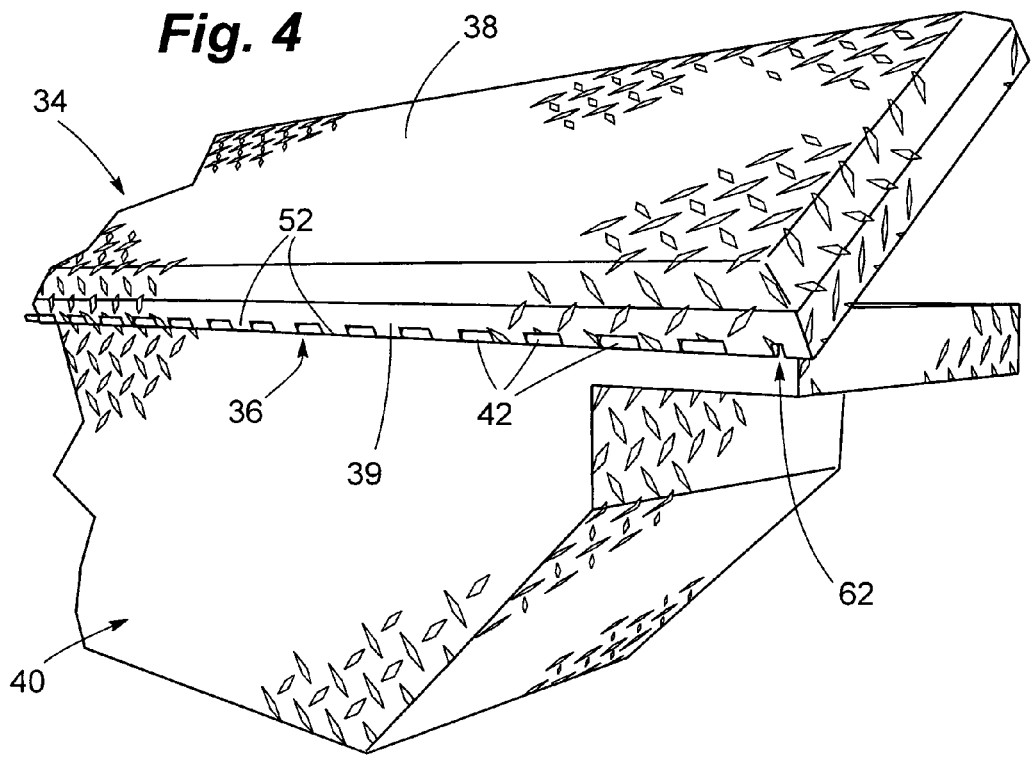
FIG. 4 is a perspective view of one end of a truck tool box formed with the hinge of the invention.
Figure 5:
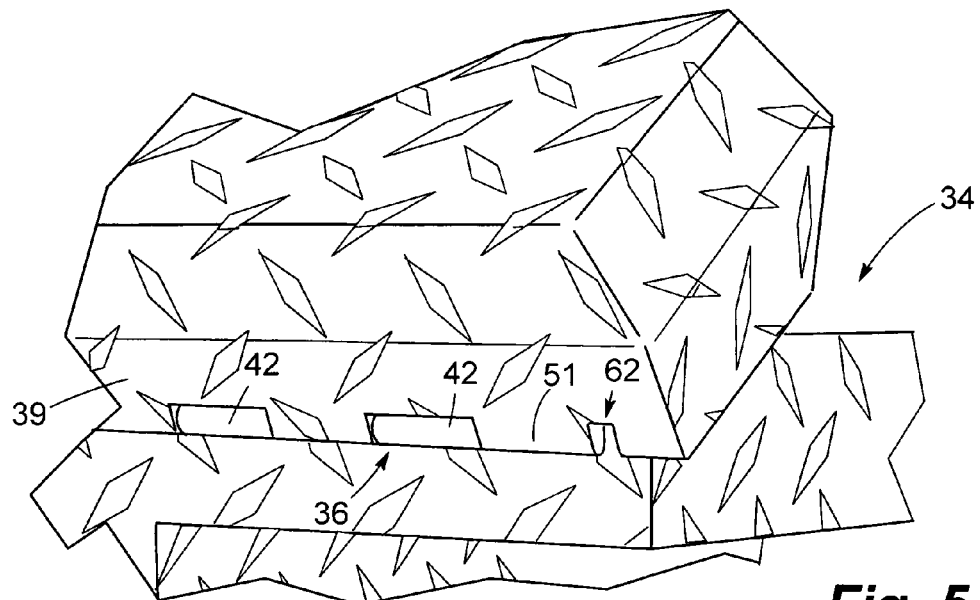
FIG. 5 is a detail perspective view of a portion of the hinge of the invention formed integrally of lid and box portions of a truck tool box.

Referring now particularly to FIGS. 4 through 14, a tool box 34 essentially identical to the conventional tool box 10 is seen to be fabricated with a hinge seen at 36 and formed essentially with the tool box 34, thereby allowing greater use of automation with resultant consistencies of appearance and strength inherent in the configuration of the hinge 36 and in the mode of manufacture thereof. With particular reference to FIG. 4, the tool box 34 is seen to comprise a lid 38 and a box portion 40 that are essentially identical to the conventional lid 12 and box portion 14 of prior art FIGS. 1-3 with the exception of formation of the hinge 36 in adjacent portions of the lid 38 and box portion 40. Referring now also to FIG. 5, the hinge of the invention seen at 36 is formed of interdigitated knuckles 42 as will be described herein, the lid 38 and the box portion 40 essentially comprising the tool box 34 being operable for opening and closing the tool box 34. However, the hinge 36 is formed without the necessity for a separately obtained and costly piano hinge as seen at 26 in FIGS. 2 and 3 as is standard in the industry. Moreover, the hinge 36 of the invention is more easily and less costly fabricated as a portion of both the lid 38 and the box portion 40 relative to the prior art piano hinge 26 which is obtained and affixed to the conventional tool box 10 typically through the agency of pop rivets and spot welds. The hinge 36 of the invention exhibits an improved appearance occasioned at least by the "finished" appearance thereof, yields a hinging element of increased strength and which is more readily manufactured such as through use of automated methods than is a tool box conventionally manufactured using a conventional piano hinge such as the piano hinge 26, manual labor being reduced substantially in the manufacture of the improved hinge 36 and the improved tool box 34.

Figure 6:
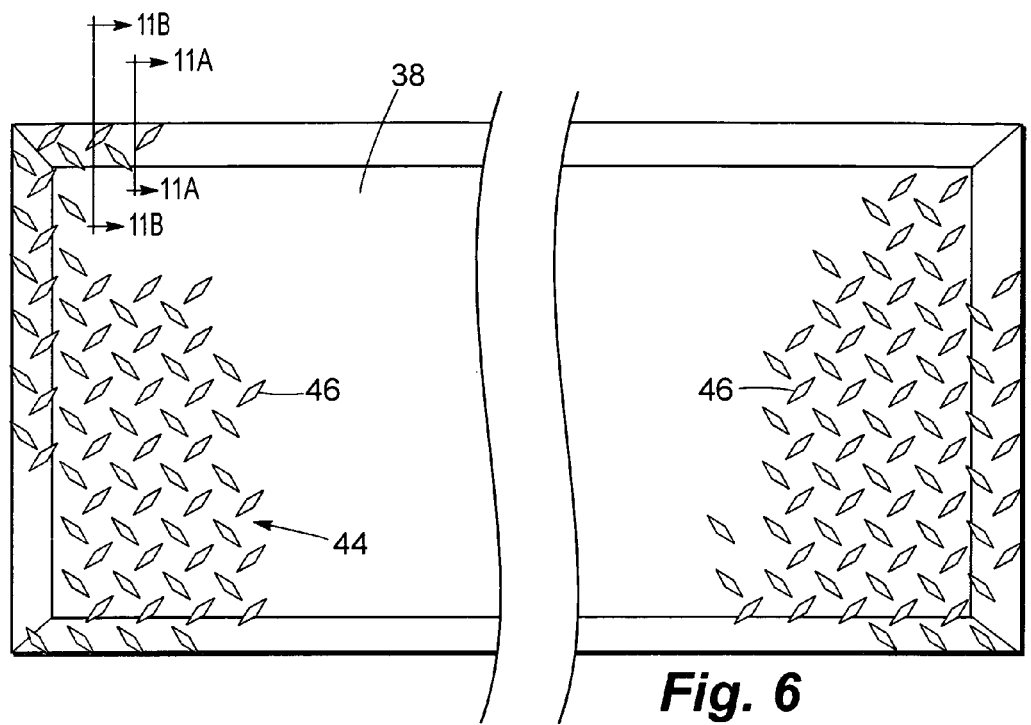
FIG. 6 is a plan view of a closed truck tool box according to the invention with a central portion cut away for ease of illustration and illustrating the inability to see the hinge of the invention formed on the tool box from this aspect angle to the tool box.

Referring now to FIG. 6, the tool box 34 of the invention is seen in a plan view and is seen in this figure as in others to have a conventional diamond tread plate pattern 44 or similar raised pattern formed of individual raised diamonds 46, the lid 38 being the only portion of the tool box 34 seen in FIG. 6. Such raised patterns are commonly employed in tool boxes of the kind shown in the drawings, use of the invention being particularly amenable to accommodation of such patterns during manufacture. FIG. 6 also provides reference to detail sectional views shown in FIGS. 11A and 11B as will be described hereinafter.

Figure 7:
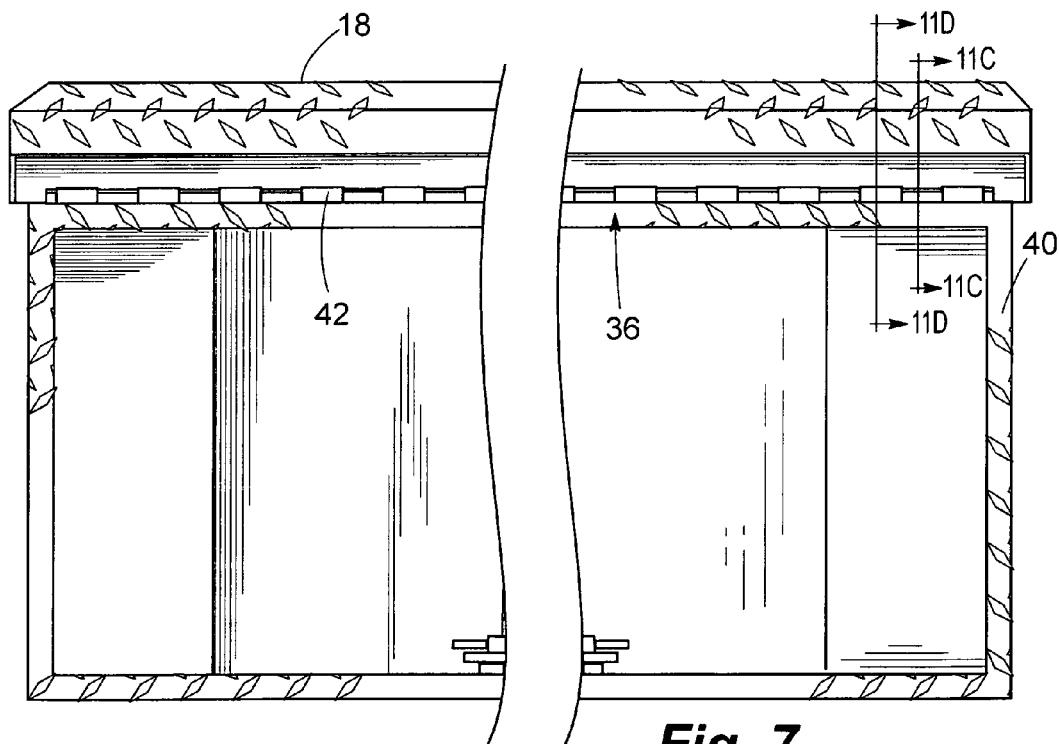
FIG. 7 is a plan view of a truck tool box configured according to the invention with the lid fully open allowing access into the tool box whereby the hinge of the invention is shown.
Figure 13:
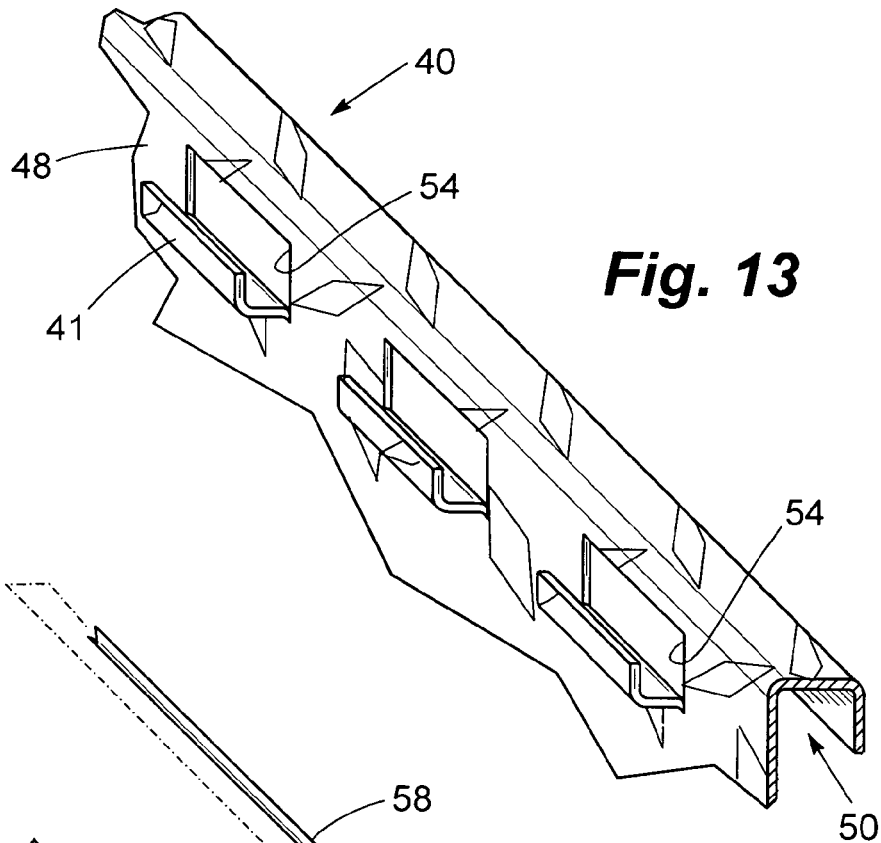
FIG. 13 is a detail cut-away perspective view of an upper portion of the box portion of the tool box illustrating a step in the formation of a portion of the hinge in the box.
Figure 14:
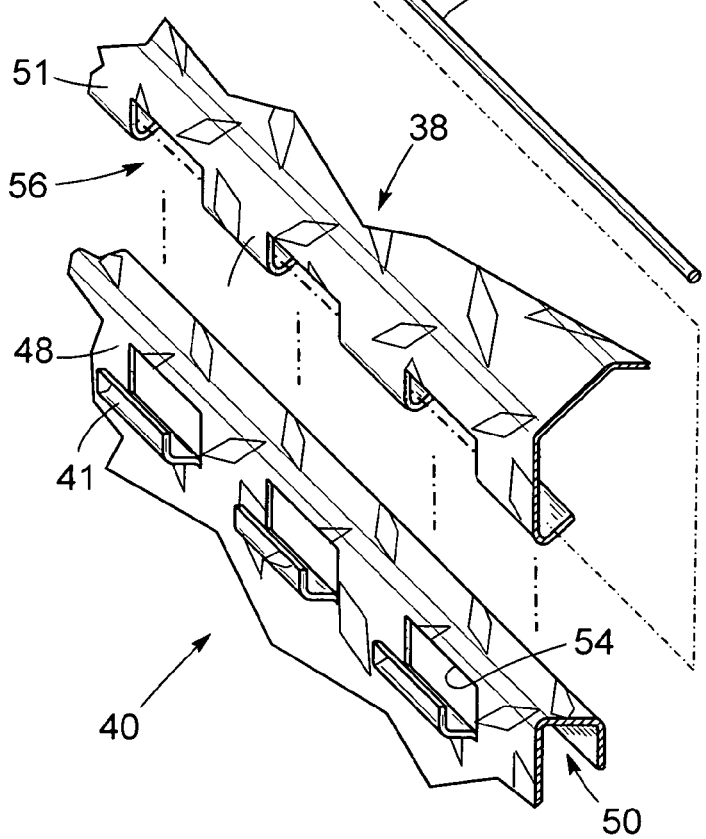
FIG. 14 is a detail cut-away perspective view of portions of a tool box lid and box illustrating a step in the formation of the hinge integral with the tool box; and, FIG. 15 is a rear elevational view of a truck bed tool box illustrating intermittently disposed groups of hinges formed according to the invention.

FIG. 7 is seen to illustrate a plan view of the tool box 34 shown with the lid 38 rotated relative to the box portion 40 as exists in the open position of the tool box 34, the improved hinge 36 being seen in finished position between the lid 38 and the box portion 40. The hinge 36 permits an opening of the lid 38 to a degree greater than 90° relative to the box portion 40. FIG. 7 also provides reference to FIGS. 11C and 11D as will be described hereinafter.

FIG. 8 is also seen to provide a view of the tool box 34 with central portions cut away for ease of illustration and showing a rear view of the tool box 34 thus illustrating the attractive and finished appearance of the improved hinge 36 and improved tool box 34 of the invention.

FIG. 9 is a simple illustration of the tool box 34 having the lid 38 in closed position relative to the box portion 40. FIG. 10 illustrates the lid 38 in a fully open position relative to the box portion 40, FIGS. 9 and 10 illustrating the clean appearance of the improved tool box 34 and the fact that the improved hinge 36 of the invention is not visible from views of side elevations of the toolbox 34 in both open and closed configurations.

With reference again to FIGS. 4 through 14, the box portion 40 of the improved tool box 34 is welded together from sheet metal blanks as is conventional and so also is the lid 38. The welded-together box portion 40 and the lid 38 are then respectively positioned in "punch and form dies" (not shown) as is constructed by a person of skill in the art of design and fabrication of forming die structures, the die being designed and fabricated for a tool box 34 of specific dimensions. The punch and form die cuts the material of the metal blank (not shown) at the rear upper edge surface 48 of the box portion 40 after the metal located at this elongated location has been bent in two locations to form a double-bend channel 50 that extends essentially the length of the rear upper edge surface 48 of said box portion 40. This double-bend channel 50 imparts strength to the box portion 40 and additionally bolsters the structural integrity of the box portion 40 to better facilitate the cutting of the edge surface 48 by the punch and form die while in the same stroke forming a series of tabs 41 in the box portion 40 and a spaced series of tabs 41. The tabs 41 are deformed outwardly of the edge surface 48 of the box portion 40 with each having an opening 54 subtended one each of the tabs 41. As the tabs 41 are crimped, each of the tabs 41 is caused to bend inwardly of the edge surface 48 and toward one each of the openings 54 to curl over a hinge pin 58 which is supported in position by distally and inwardly curving portions of similar tabs 51 formed in the lid 38 formed in another punch and form die in depending rear skirt 39 of the lid 38, the inwardly curving distal portions of the tabs 51 acting to cradle and support the hinge pin 58 immediately prior to crimping of the tabs 41 and the tabs 51 about the hinge pin 58. The crimped knuckles 42 and 52 are disposed in an offset relation to outer surfaces of the box portion 38, the crimped knuckles 42 and 52 along with the hinge pin 58 being aligned longitudinally along the longitudinal axis of the hinge pin 58. Spaces 56 formed in the skirt 39 of the lid 38 receive the crimped knuckles 42 of the box portion 38. The crimped knuckles 42 and 52 thus are disposed in interdigitating relation.

A clamping fixture (not shown) is designed and fabricated for these functions by a person of skill in the art, the knuckles 42 and 52 as well as the pin 58 being curled into cooperative relation using a conventional hydraulic curling/crimping punch (not shown) that moves in an up and down fashion to crimp the tabs 41 and 51 at an exact force, the crimped knuckles 42 and 52 of the hinge 36 being seen in detail sections in FIGS. 11A and 11B taken through lines 11A-11A and 11B-11B referred to in FIGS. 6, and 11C-11C and 11D-11D of FIG. 7. The crimping operation is conducted at a force as will be known to a person of skill in the art to provide smooth operation of the hinge 36.

As is best seen in FIG. 4, a notch 62 is seen to be formed in the skirt 39 at an end thereof. The notch 62 relieves the structure to allow the last knuckle 42 to curl around the hinge pin 58, thereby allowing transition between flat and curled conformations.

Figure 15:
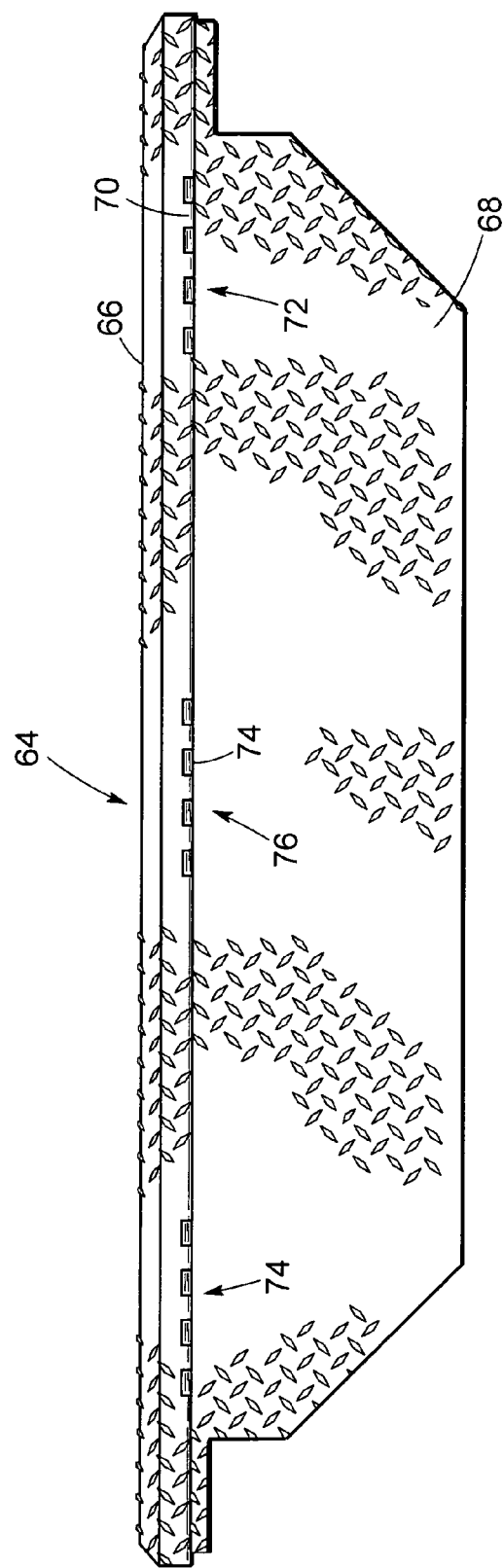

The improved hinge 36 resulting from the fabrication operations thus described can be formed with differing dimensions of the knuckles 42 and 52 and with differing spacing therebetween as is desired given the exigencies of a given tool box design. For example, spaced end groupings 74 and a central grouping 76 of crimped knuckles 70 (formed from lid 66) and crimped knuckles 72 (formed from box portion 68) are seen in tool box 64 of FIG. 15. Each of the groupings 74, 76 include a hinge pin (not seen in FIG. 15) similar to the pin 58 although of a sufficient length to fit the groupings 74, 76. Portions of the lid 66 between the groupings 74, 76 can be trimmed as necessary to accommodate a desired degree of opening of the lid 66 and can be accomplished during forming of the lid 66 such as generally discussed hereinabove. Groupings formed of crimped knuckles 70 (from material in the lid 66) and crimped knuckles 72 (from material in the box portion 68) can be formed of fewer crimped knuckles or a greater number of crimped knuckles as desired. Accordingly, groupings of the crimped knuckles 70, 72 can be spaced apart such as at either end of the tool box 34 and in the middle of a hinge also formed according to the invention. Such "spaced" hinge portions can be formed in a single tool box and can be formed at a favorable cost, easy assembly and of a different appearance relative to the hinge 36 seen expressly in certain of the drawings. In general, the nominal dimensions of the spaces 54 and 56 and of the crimped knuckles 42 and 52 inter alia are taken to be on the order of 1.0 inch although such dimensions are exemplary and not intended to limit the scope of the invention as is defined by the recitations of the appended claims.

What is claimed is:

1. In a truck bed tool box or the like having a lid and a box portion to which the lid is mounted for pivoting movement, the improvement comprising:

hinge means for structurally and functionally connecting the lid and the box portion of the tool box and having a first portion formed integrally of the lid and being formed of the same material as is the lid, the hinge means having a second portion formed integrally of the box portion, the second hinge portion being formed of the same material as is the box portion, the first and second portions of the hinge means being integral respectively with said lid and said box portion; and, a hinge pin carried by the first and second portions of the hinge means and about which portions of the first and second hinge portions rotate on relative movement between the lid and the box portion, thereby allowing pivoting movement of the lid relative to the box portion of the tool box.

2. In the improved truck bed tool box of claim 1 wherein the first portion of the lid has at least one depending skirt element extending therefrom into adjacent relationship with an edge surface of the second portion of the box portion and being pivotally mounted by said hinge means to the box portion, the improvement further comprising the first portion of the hinge means being formed integrally of the skirt element, the first portion of the hinge means being formed of the same material as is the skirt element, the box portion having an edge surface opposing the skirt element and in which the second portion of the hinge means is formed, the second portion of the hinge means being formed of the same material as is the edge surface.

3. In the truck bed tool box of claim 2 wherein the improvement further comprises groups of the hinge means being spaced apart along the extent of the opposed skirt element of the lid and of the box portion, the hinge means being discontinuous therealong.

4. In the truck bed tool box of claim 2 wherein the hinge means are continuous along the extent of the opposed skirt element of the lid and of the box portion.

5. In the truck bed tool box of claim 2 wherein a redoubled channel is disposed adjacent to the edge surface and inwardly of the box portion and integrally formed therewith, the channel reinforcing the edge surface during forming operations conducted relative to the edge surface of the box portion.

6. In the improved truck bed tool box of claim 1 wherein an edge of the lid has a series of first tabs formed and spaced apart therein in interdigitated relation, the tabs being curled about the hinge pin to form crimped knuckles pivotally movable about the hinge pin.

7. In the truck bed tool box of claim 1 wherein an edge surface of the box portion has a series of second tabs formed and spaced apart therein in interdigitated relation, the tabs being curled about the hinge pin to form crimped knuckles pivotally movable about the hinge pin.

8. In the truck bed tool box of claim 1 wherein an edge of the lid has a series of first tabs formed therein in interdigitated and spaced apart relation and an edge surface of the box portion has a series of second tabs formed therein in interdigitated and spaced apart relation, at least certain of the first and second tabs being curled about the hinge pin to form crimped knuckles pivotally movable about the hinge pin.

9. In the truck bed tool box of claim 1 wherein the lid and the box portion are formed of aluminum.

10. In the truck bed tool box of claim 1 wherein the lid and the box portion are formed of a material selected from the group consisting of aluminum, steel and painted steel.

11. In the truck bed tool box of claim 1 wherein the lid and the box portion are formed of low gauge aluminum.

12. In the improvement of claim 1 and further comprising a notch formed in the lid adjacent to and spaced from the hinge means, the notch allowing crimping of the first portion of the hinge means adjacent to said notch.

13. A truck bed tool box having a lid with at least one depending skirt formed integrally with the lid and a separate box portion, said lid and box portion being disposed in opposing relation to each other for relative motion therebetween, comprising:
 a hinge pin;
 a series of first tabs formed in the skirt in interdigitated relation and having spaces therebetween; and,
 a series of second tabs formed in the box portion in interdigitated relation, the second tabs being each received within one each of the spaces in the skirt of the lid, the tabs being curled about the hinge pin to form crimped knuckles pivotally movable about the hinge pin to form a hinge having major portions thereof integral with the lid and major portions thereof integral with the box portion of the tool box, thereby forming a hinged tool box having an attractive and finished appearance, a satisfactory level of strength and rigidity and a satisfactory cost profile.

14. The truck bed tool box of claim 13 wherein the hinge comprises groups of the knuckles spaced apart along the extent of the lid and of the box portion, the hinge being discontinuous therealong.

15. The truck bed tool box of claim 13 wherein the hinge is continuous along the extent of the lid and of the box portion.

16. The truck bed tool box of claim 13 wherein a redoubled channel is disposed adjacent to a surface of the box portion and inwardly of the box portion and integrally formed therewith, the channel reinforcing the surface of the box portion during forming operations conducted relative to the surface of the box portion.

17. The truck bed tool box of claim 13 wherein an edge of the lid has a series of first tabs formed therein in interdigitated relation and an edge surface of the box portion has a series of second tabs formed therein in interdigitated relation, the first and second tabs being curled about the hinge pin to form crimped knuckles pivotally movable about the hinge pin.

18. A method for forming a hinge functioning to allow pivoting movement between a lid and a box portion of a truck bed tool box or the like, the lid having at least one depending skirt extending toward and being adjacently opposed to an edge portion of the box portion when assembled together, comprising the steps of:
 forming a series of spaced first tabs in a material of which the lid is formed, at least certain of the first tabs being distally bent simultaneously with formation of the first tabs;
 forming a series of spaced second tabs in a portion of the box portion adjacent the lid when in assembled relation;
 placing the first and second tabs in positions whereby at least certain of the first tabs extend into spaces between the second tabs and at least certain of the second tabs extend into spaces between the first tabs of said lid, thereby to engage at least certain of said first and second tabs of said lid and said box portion respectively in interdigitated relation therebetween;
 placing a hinge pin within the distally bent portions of the at least certain of the first tabs formed in the lid; and,
 crimping at least certain of the first and second tabs about the hinge pin to allow relative motion of knuckles thus formed about the hinge pin.

19. The method of claim 18 wherein a notch is disposed adjacent to a terminal end of the hinge, thereby relieving the structure to allow crimping of tabs disposed at an end of the hinge.

20. The method of claim 18 wherein portions of the hinge are formed integrally of the lid and of the box portion of the truck bed tool box.

21. The method of claim 18 wherein the at least certain of the first and second tabs are simultaneously crimped about the hinge pin.

22. A method for forming a hinge functioning to allow pivoting movement between a lid and a box portion of a truck bed tool box or the like, the lid having at least one depending skirt extending toward and being adjacently opposed to an edge portion of the box portion when assembled together, comprising the steps of:
 forming a series of spaced first tabs in a material of which the lid is formed;

forming a series of spaced second tabs in a portion of the box portion adjacent the lid when in assembled relation;

placing the first and second tabs in positions whereby each of the first tabs extend into spaces between the second tabs and each of the second tabs extend into spaces between the first tabs of said lid, thereby to engage said first and second tabs of said lid and said box portion respectively in interdigitated relation therebetween;

crimping at least certain of the first and second tabs; and, placing a hinge pin within the crimped portions of the first and second tabs, relative motion between the knuckles and the hinge pin thus being allowable.

23. The method of claim 22 wherein a notch is disposed adjacent to a terminal end of the hinge, thereby relieving the structure to allow crimping of tabs disposed at an end of the hinge.

24. The method of claim 22 wherein portions of the hinge are formed integrally of the lid and of the box portion of the truck bed tool box.

25. The method of claim 22 wherein at least certain of the first and second tabs are simultaneously crimped about the hinge pin.

* * * * *